United States Patent [19]

Etter et al.

[11] Patent Number: 5,622,202

[45] Date of Patent: Apr. 22, 1997

[54] TAMPER PROOF FIRE HYDRANT

[76] Inventors: Mitchell K. Etter, P.O. Box 330;
Leonard F. Gropper, III, P.O. Box 152, both of East Quogue, N.Y. 11942

[21] Appl. No.: 215,516

[22] Filed: Mar. 22, 1994

[51] Int. Cl.$^6$ .................... F16K 31/16; F16H 47/00
[52] U.S. Cl. ................ 137/272; 251/58; 251/59; 251/249.5
[58] Field of Search ........................ 137/272, 281, 137/282; 251/58, 248, 249.5, 59, 291, 292; 60/325; 416/157 A

[56] References Cited

U.S. PATENT DOCUMENTS

| 849,105 | 7/1907 | Beale et al. | 251/59 |
|---|---|---|---|
| 1,272,639 | 7/1918 | Dunn | 137/282 |
| 1,646,631 | 10/1927 | Schnyder | 251/59 |
| 2,596,532 | 5/1952 | Coolidge et al. | 251/291 |
| 2,743,897 | 5/1956 | Elliott et al. | 251/59 |
| 2,780,432 | 2/1957 | Shafer | 251/59 |
| 3,079,750 | 3/1963 | Leach | 251/59 |
| 3,204,920 | 9/1965 | Generke | 251/58 |
| 3,207,468 | 9/1965 | Lauducci et al. | 251/58 |
| 3,485,269 | 12/1969 | Coletti | 251/59 |
| 3,532,108 | 10/1970 | Sullivan | 251/291 |
| 3,688,645 | 9/1972 | Reaves | 251/59 |
| 3,752,041 | 8/1973 | Smith | 251/59 |
| 3,768,775 | 10/1973 | Archer | 251/291 |
| 3,977,648 | 8/1976 | Sigmon | 251/59 |
| 4,206,900 | 6/1980 | Willis | 251/58 |
| 4,757,684 | 7/1988 | Wright | 251/59 |
| 4,776,363 | 10/1988 | Avelli | 137/272 |
| 4,901,977 | 2/1990 | Hendrick | 251/248 |
| 5,101,862 | 4/1992 | Leete | 251/59 |
| 5,386,761 | 2/1995 | Holtgraver | 251/292 |

Primary Examiner—George L. Walton
Attorney, Agent, or Firm—Kelly & Hulme, P.C.

[57] ABSTRACT

A tamper proof fire hydrant which may only be operated by the application of pressurized fluid. The pressurized fluid engages the fire hydrant and travels through a pathway in the upper portion of the fire hydrant. The pressurized fluid engages a turbinelike impeller and then the pressurized fluid pressure rotates the impeller, the impeller is connected to a worm gear and turns the worm gear which then operates to open the hydrant's water main valve. Later the flow of fluid is then reversed in order to turn the turbinelike impeller in the opposite direction thereby causing the worm gear to operate to close the hydrant's water main valve. A cylinder and piston may be used in place if the impeller and worm gear, to open and close a water main valve in response to the application of pressurized fluid to the fire hydrant from an external source.

2 Claims, 5 Drawing Sheets

TAMPER PROOF FIRE HYDRANT

FIELD OF THE INVENTION

The present invention relates generally to fire hydrants and to improvements in fire hydrants for providing a tamper proof fire hydrant.

BACKGROUND OF THE INVENTION

Hydrants connected to water lines provide water outlets throughout a community for use in fighting fires. Such hydrants are of necessity located in public areas where they are highly accessible and readily noticeable so that they may be quickly located and accessed by fire fighters in an emergency. However, this accessibility also exposes the fire hydrants to vandalism and to unauthorized use, particularly in urban areas where they are frequently opened during the summertime by adults in order to allow children to play and cool off in the water from the hydrant. Such vandalism and unauthorized use can damage the hydrant thereby creating a greater risk of danger to the neighborhood due to inoperative fire hydrants which will create a fire fighting problem.

The unauthorized use of fire hydrants also costs the public additional funds in order to pump the water which escapes from a hydrant during unauthorized use. The extent to which fire hydrants are used in an unauthorized manner during the summertime is often so severe that it causes lower water pressure throughout the neighborhood thereby greatly increasing the risk of damage to the neighborhood by fire due to the inadequate water supply resulting therefrom.

It has previously been known to provide for a fire hydrant which could only be operated by persons in possession of a key member, so that the hydrant outlets were normally covered and said covers could only be removed when the hydrant was unlocked, and the hydrant valve nut member which controls the opening and closing of the hydrant valve is located on top of the hydrant and is concealed. Such an arrangement is shown by U.S. Pat. No. 2,869,576 to W. Kennedy. It is also known to provide a fire hydrant arrangement where the nut that operates the valve is concealed and requires a special wrench in order to engage the nut through a limited access, as disclosed in U.S. Pat. No. 3,556,131 to R. Diaz. U.S. Pat. No. 3,935,877 to P. Franceschi also provides for a tamper proof locking system for a standard fire hydrant which includes a cap assembly that fits over the valve stem of the hydrant and can only be operated by means of a special wrench. U.S. Pat. No. 4,651,771, issued to A. Borenstein, provides for a fire hydrant cap and cover assembly unit with a wrench for operating same, the interior of the cap is threaded and releaseably attachable to the fire hydrant water outlet and the exterior cover is rotatably mounted on the cap through means of an annular groove and bead, with the cover rotatably protecting the cap removal, and with a wrench which is capable of passing through an opening in the exterior cover in order to engage the cap and remove same from the water outlet port.

Removal of the fire hydrant water outlet port cap in the prior art can be quite difficult during an emergency and introduction of any foreign objects under the rotating cap makes it most difficult to remove the cap for hydrant operation.

The present device differs from those previously known in that the present device requires an external pressurized fluid providing device which engages the fire hydrant and pumps pressurized fluid through a pathway in the upper portion of the fire hydrant and engages a turbinelike impeller and then said pressurized fluid pressure rotates the impeller, said impeller is connected to a worm gear and turns the worm gear which then opens the hydrant's water main valve. Later the flow of fluid is then reversed in order to turn the turbinelike impeller in the opposite direction thereby causing the worm gear to close the hydrant's water main valve. The pressurized fluid used may be either pressurized liquid or pressurized gas.

Such a device would require the operator of the fire hydrant to be in possession of pressurized fluid equipment as is already provided for on modern fire trucks and which is not readily available to members of the general public. Therefore it would be much more difficult for a member of the general public to operate the fire hydrant of the present invention than it would be for a member of the general public to operate one of the fire hydrant's known in the prior art, as the prior art fire hydrants all involve operation of the fire hydrant by means of a key or wrench mechanism which past experience has shown is easily overcome by the general public.

A cylinder and piston drive means, or other well known drive means, can be used in place of the Impeller and worm gear drive means without departing from the scope of the invention.

SUMMARY OF THE INVENTION

The tamper proof fire hydrant of the present invention overcomes the aforementioned problems encountered by the prior art by requiring a separate external portable pressurized fluid source in order to operate the fire hydrant of the present invention. This will make it far more difficult for the general public to tamper with or operate the fire hydrant as the general public does not have access to the type of equipment that would provide the required external pressurized fluid source. Fire departments, on the other hand, have equipment for pumping pressurized fluid on their fire trucks.

The present invention provides an outer fire hydrant body having an upper portion with a fluid inlet opening therein which receives pressurized fluid from an external source which flows in through the fluid inlet opening through a conduit and into an impeller. The flow of the pressurized fluid engages the impeller causing the impeller to rotate and the pressurized fluid then flows out through a second conduit and out of the outer fire hydrant body by means of a second opening in the outer fire hydrant body to which the second conduit is attached. The impeller is connected to an axle which is in turn connected to a worm gear. The flow of the pressurized fluid through the conduits and through the impeller causes the impeller to rotate, thereby rotating the axle. The rotation of the axle in turn causes the worm gear to be actuated and to lower a drive shaft to which the worm gear is attached. The drive shaft passes from the upper portion of the hydrant body to a lower portion of the hydrant body where it is attached to a water main valve stem. The water main valve stem is attached between the drive shaft and the water main valve. When the drive shaft is lowered it causes the water main valve stem to be lowered which then opens the water main valve. When the water main valve is in the open position, water from the water main will flood the lower portion of the fire hydrant body and exit the fire hydrant through water outlet ports provided in the fire hydrant body and to which fire fighters connect their fire hoses.

A directional valve means is also provided which is capable of changing the direction of the pressurized fluid flow so that it comes into contact with the impeller while flowing in the opposite direction, causing the impeller and axle to rotate in the opposite direction, thereby operating the worm gear so as to raise the drive shaft and water main valve stem and to close the water main valve.

The direction of rotation of the impeller (and therefore the opening or closing of the water main valve) may also be controlled without a directional valve by merely controlling whether the pressurized fluid from the external source is applied to the first or second opening in the fire hydrant body. When applied to the second opening it will travel in the opposite direction thereby rotating the impeller in a second direction and closing the water main valve.

It is therefore an object of our invention to provide for a fire hydrant which is hydraulically operated by means of the flow of pressurized fluid which will cause an impeller to rotate, the rotation of the impeller will cause a worm gear to lower its drive shaft thereby opening the water main valve. A directional valve is provided for reversing the flow of pressurized fluid thereby causing the impeller and worm gear to rotate in the opposite direction and raise the drive shaft thereby closing the water main valve.

In another embodiment of the present invention, it is also contemplated that the impeller may be fixable mounted to a threaded drive shaft, so that rotation of the impeller will cause the drive shaft to be raised or lowered depending on the direction of rotation of the impeller. This embodiment would therefore have no worm gear but would otherwise function in the same manner as the above embodiment which utilizes a worm gear.

In the embodiments which utilize a worm gear, a clutch may be provided therein in order to prevent the device from being over-torqued when the water main valve is being open or closed.

Another object of our invention is to provide for a tamper proof fire hydrant wherein pressurized fluid from an external source is utilized to cause the pressurized fluid to flow into a hydraulic piston cylinder, thereby causing a piston to be pushed outwardly away from the interior of the piston cylinder and to thereby operate a water main valve. A spring is provided in such a manner as to cause the piston to be reseated and returned to its original position in the cylinder once the pressurized fluid is no longer being applied, a bleeding valve is provided in order to allow the excess pressurized fluid to leak from the piston cylinder so that the spring may encourage the piston to return to its original position and thereby close the water main valve.

It is another object of our invention to provide for a pressurized fluid inlet nozzle having a spring loaded ball valve. The spring loaded ball valve will be hard to open by hand and will therefore operate to prevent the intrusion of rain, foreign objects and debris from entering into the fire hydrant through the fluid inlet opening in the absence of the external fluid pressure source. When the external fluid pressure source is engaged with the water inlet nozzle then the fluid pressure will cause the spring loaded ball valve to open, thereby allowing the pressurized fluid to enter into the fire hydrant and operate the fire hydrant as herein described.

It is a further object of this invention to provide a locking means within the fluid inlet nozzle. The locking means would engage the nozzle of the external fluid pressure source when the tire hydrant was in operation, thereby preventing removal of the external fluid pressure source until such time as the fire hydrant was turned off. Such a locking means would prevent vandals and unauthorized users from turning on the fire hydrant and leaving it on after they had removed their external fluid pressure source. Since the external fluid pressure source would of necessity De more expensive than the key or wrench devices needed in order to operate the prior art, it is unlikely that an unauthorized user would be willing to leave the fire hydrant in an "on" position after the unauthorized user had left the vicinity of the fire hydrant, as the locking mechanism would require the unauthorized user to leave behind his external fluid pressure source in order to leave the fire hydrant in an "on" position. The locking mechanism would also make it easier for fire department and law enforcement officials to confiscate the equipment used to turn on the fire hydrant (the external fluid pressure source) when they encountered a fire hydrant that was left on, or that was being currently used by unauthorized personnel.

The foregoing and other objects of the present invention will appear more fully upon the following description and the accompanying drawings which illustrate a preferred embodiment of the invention. It is to De understood that changes may be made from the exact details shown and described without departing from the principles of the invention.

DETAILED DESCRIPTION OF THE INVENTION

Figure 1:
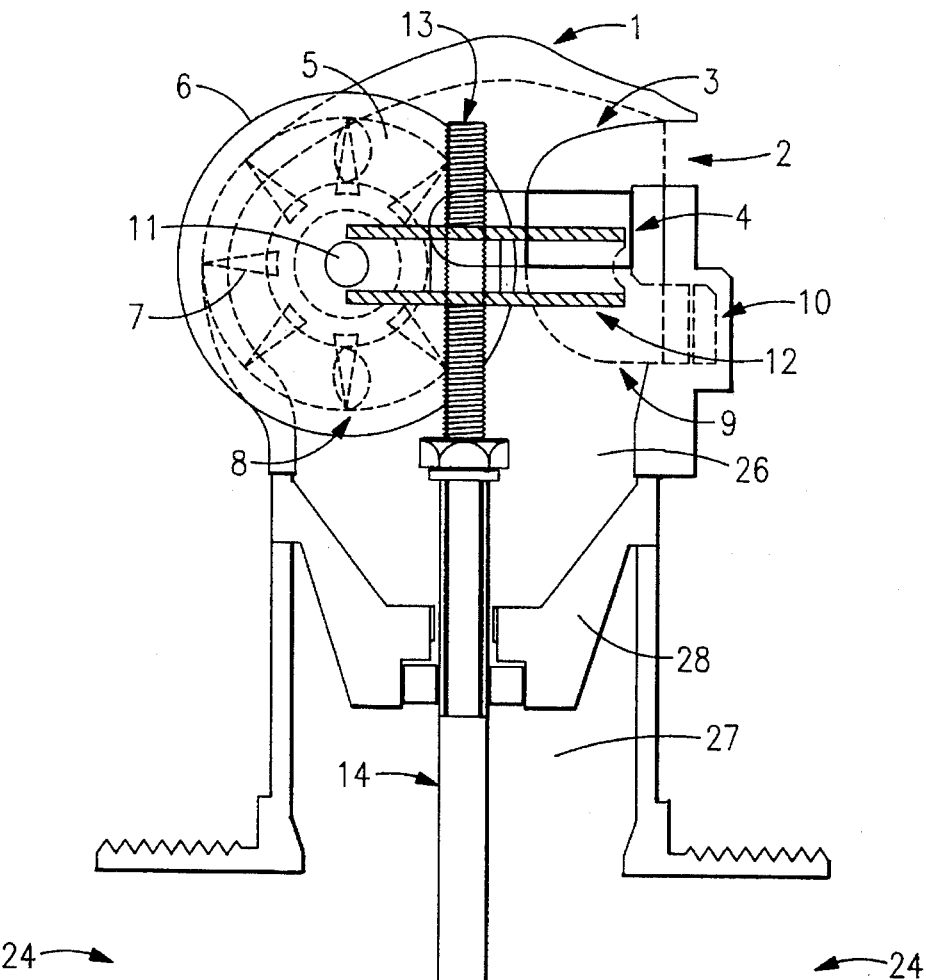
FIG. 1 is a cross-sectional view of one embodiment of the present invention.
Figure 1:
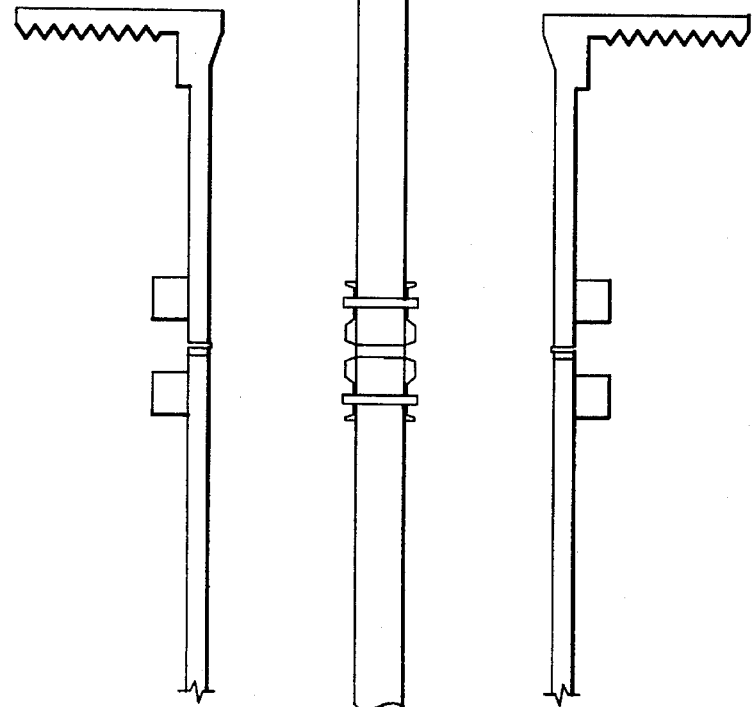

Referring to FIG. 1 of the drawings, one preferred embodiment comprises an outer fire hydrant body 1 which is formed so as to have an upper chamber 26 and a lower chamber 27 which are separated by means of a wall 28. The upper chamber 26 has a first fluid opening 2 formed therein for communication between the interior of the upper chamber 26 and the exterior of the outer fire hydrant body 1. A first conduit 3 is attached to the interior of the upper chamber 26 in such a manner as to cause the first conduit 3 to cover the entire first fluid opening 2 on the interior side of the outer fire hydrant body 1. The other end of the first conduit 3 is attached to a directional valve 4. A second conduit 5 is attached between the directional valve 4 and an impeller chamber 6. A third conduit 8 is attached from the impeller chamber 6 to the directional valve 4 and a fourth conduit 9 is attached from the directional valve 4 to a second fluid opening 10 which is formed in the outer fire hydrant body 1.

An impeller 7 is rotatably mounted in the impeller chamber 6. An axle 11 is fixedly attached to the impeller 7 at the impeller 7's rotational center so that the axle 11 extends perpendicularly away from the plain of rotation of the impeller 7.

The axle 11 is threaded and drives a worm gear 12. The worm gear 12 is a standard type worm gear such as is commonly known in the mechanical field. The worm gear 12 is attached to a drive shaft 13 in such a manner as to raise or lower the drive shaft 13 depending upon the direction of rotation of the axle 11. The drive shaft 13 is threaded.

The drive shaft 13 is fixedly connected to an existing water main valve stem 14. The water main valve stem 14 is connected to an existing water main valve and water from the water main is what supplies the fire hydrant of the present invention when it is being operated. The water main valve stem 14 is provided as part of the existing water main valve and is not part of the present invention.

Figure 2:
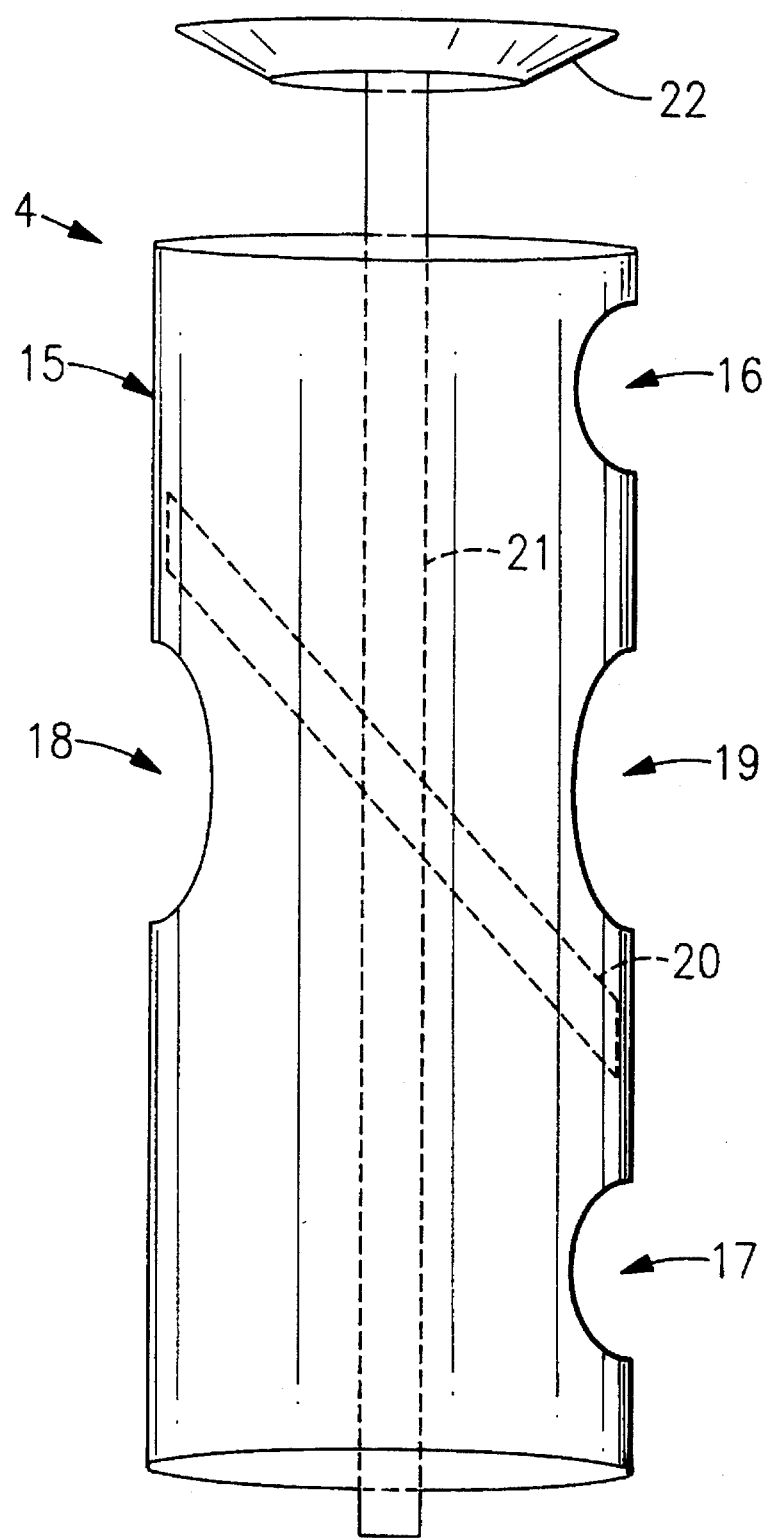
FIG. 2 is a plan view of one possible directional valve means utilized in conjunction with some embodiments of the present invention.
Figure 3:
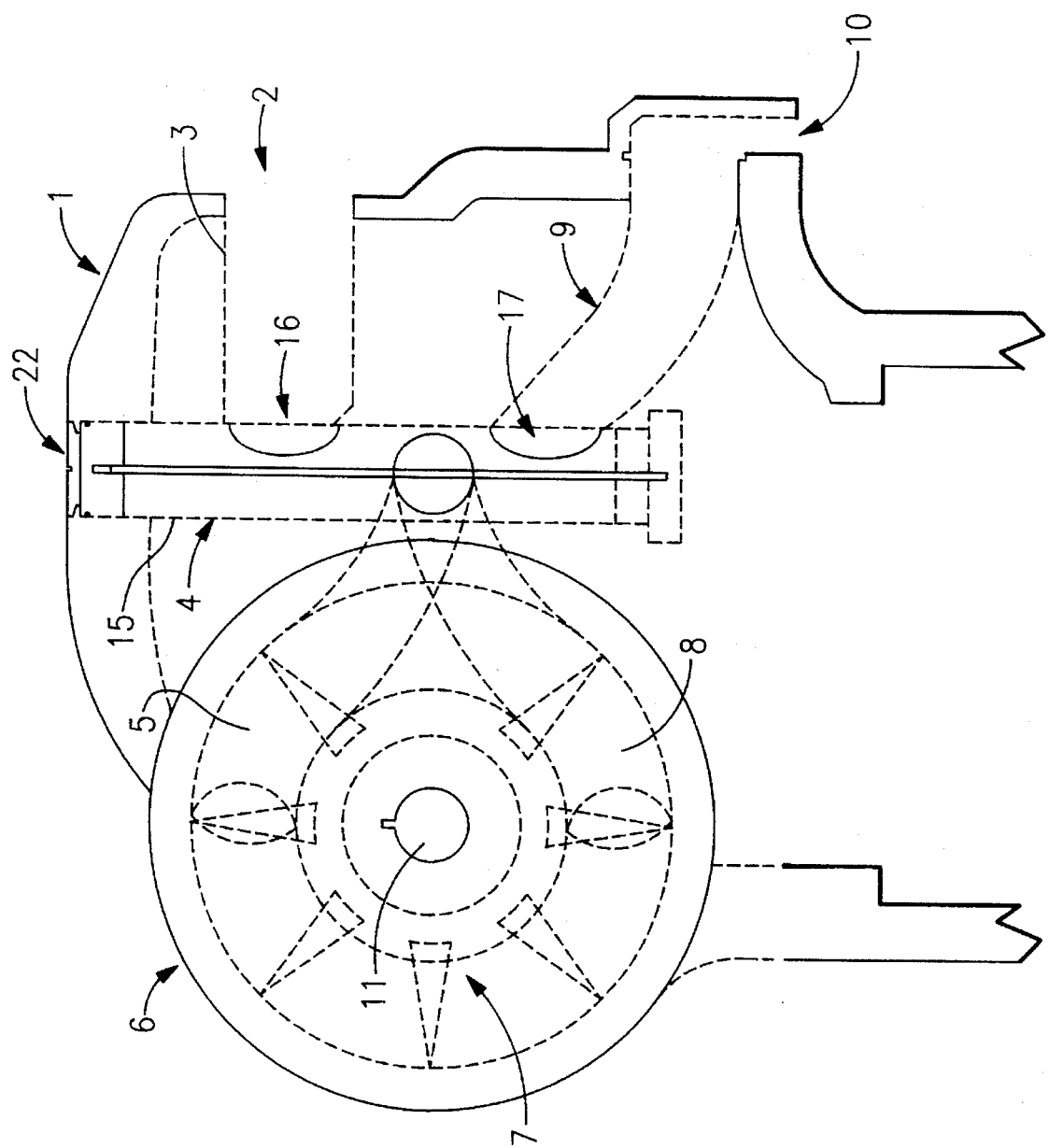
FIG. 3 is a partial view of one embodiment of the present invention.
Figure 4:
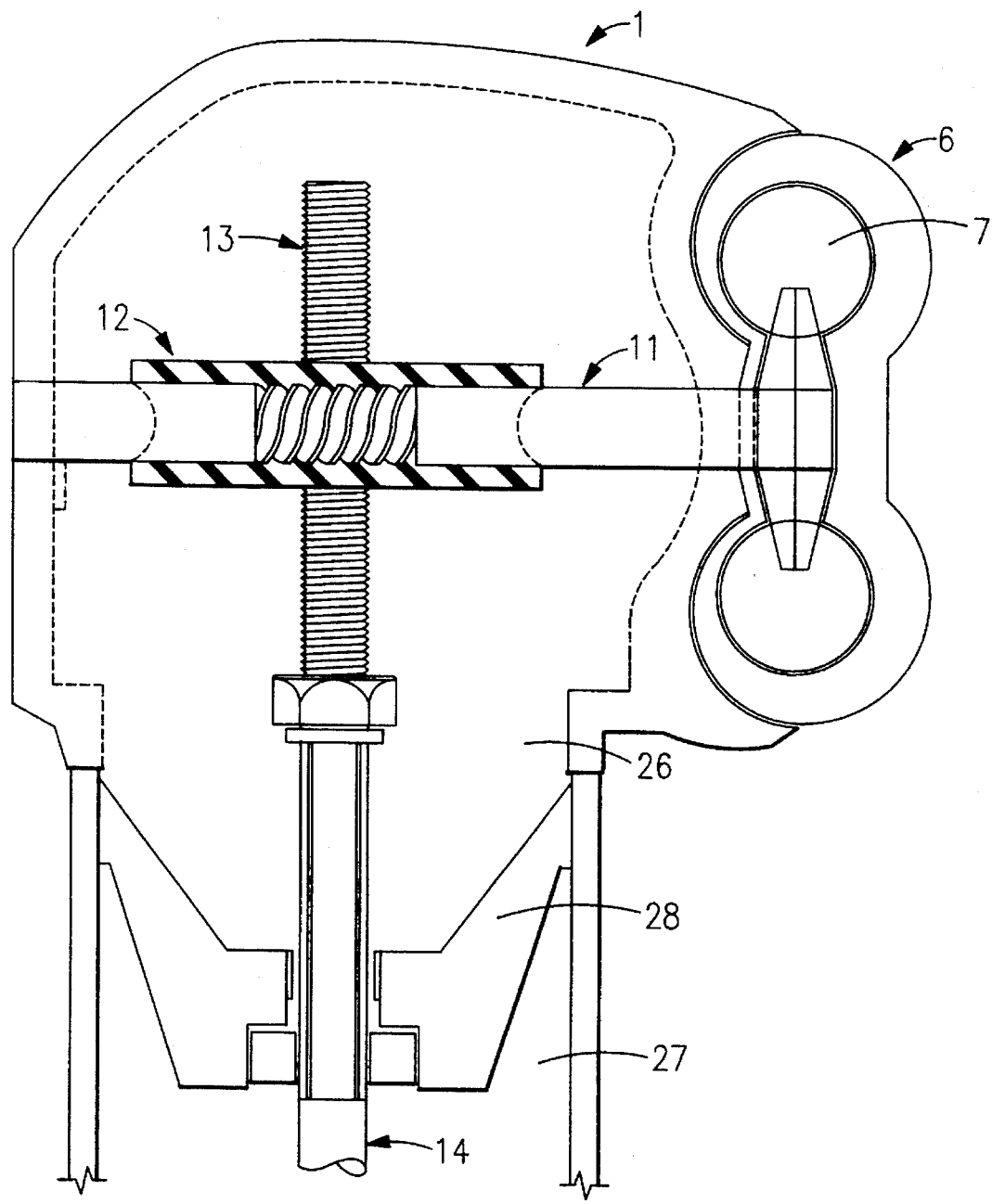
FIG. 4 is a partial view of one embodiment of the present invention.

The directional valve 4, as shown in FIG. 2, is comprised of a hollow cylindrical body 15 having four openings formed in its outer body which communicate with the hollow inside space of the cylindrical body 15. The first opening 16 and the second opening 17 in the side walls of the cylindrical body 15 are located in close proximity to opposite ends of the cylindrical body 15 as shown in FIG. 2. The third opening 18 and the fourth opening 19 in the cylindrical body 15 which form a part of the directional valve 4 are located diametrically opposite one another in the middle of the cylindrical body 15.

A disc shaped switch means 20 is centrally located inside of the cylindrical body 15 and rotatably mounted therein so that it can be moved to an "on" position where the first opening 16 and the fourth opening 19 are interactively connected and the second opening 17 and the third opening 18 are also interactively connected to one another but so that the first opening 16 and the fourth opening 19 are internally isolated inside the cylindrical body 15 from the second opening 17 and the third opening 18. The disc shaped means 20 can be rotated to an "off" position wherein the first opening 16 and the third opening 18 are interactively connected inside of the cylindrical body 15 and the second opening 17 and the fourth opening 19 are also interactively connected internally within the cylindrical body 15 but so that the first opening 16 and third opening 18 are internally isolated within the cylindrical body 15 from the second opening 17 and the fourth opening 19.

The disc shaped means 20 is connected by means of a rod 21 to a flow control knob 22, which said flow control knob 22 is mounted on the exterior of the fire hydrant body 1. The flow control knob 22, the rod 21, and the disc shaped means 20 are so connected in such a manner that when the flow control knob 22 is in an "on" position the disc shaped means 20 is also in an "on" position as defined earlier. When the flow control knob 22 is turned to an "off" position it causes the rod 21 to rotate and thereby switches the disc shaped means 20 from an "on" position to an "off" position.

Referring again to FIG. 1 and FIG. 2, when the flow control knob 22 is in an "on" position and an external pressurized fluid source is connected to the first fluid opening 2, pressurized fluid will flow into the fire hydrant body 1 through the first fluid opening 2 and through the first conduit 3 to the directional valve 4 where the disc shaped means 20 will cause the flow of the pressurized fluid to be directed out of the fourth opening 19 in the cylindrical body 15. The pressurized fluid will then flow from the directional valve 4 through the second conduit 5 to the impeller chamber 6 where it will impact on the blades of the impeller 7 and cause the impeller 7 to rotate in a first direction. The pressurized fluid will then flow out of the impeller chamber 6 and through the third conduit 8 and into the cylindrical body 15 by means of the third opening 18, and the pressurized fluid will then flow out of the second opening 17 and through the fourth conduit 9 to the second fluid opening 10 where it will exit the fire hydrant body 1.

The rotation of the impeller 7 in a first direction will cause the axle 11 to also rotate in a first direction thereby driving the worm gear 12 in such a fashion as to cause the drive shaft 13 to be lowered, thereby lowering the water main valve stem 14 and opening the water main valve allowing water from the water main to fill the interior space of the lower chamber 27 of the fire hydrant body 1 and to flow outward from said fire hydrant body by means of a plurality of water discharge ports 24 which are found in the outer surface of the lower chamber 27 and to which the fire fighters connect their fire hoses.

When the flow control knob 22 is turned to an off position, it will cause the disc shaped means 20 to be in an "off" position wherein the first opening 16 and the third opening 18 will be interactively connected in the interior of the cylindrical body 15 thereby causing fluid to flow in from the first conduit 3 into the cylindrical body 15, out of the third opening 18 and through the third conduit 8 to the impeller chamber 6 where the fluid will impact on the blades of the impeller 7 and cause the impeller 7 to turn in a second direction. The fluid will then flow from the impeller 7 through the second conduit 5 and into the cylindrical body 15 by means of the fourth opening 19 and out of the cylindrical body 15 by means of the second opening 17 and through the fourth conduit 9 to the fluid outlet opening 10. The rotation of the impeller 7 in a second direction will cause the axle 11 to rotate in a second direction thereby driving the worm gear 12 in such a manner as to cause the drive shaft 13 to be raised, which will in turn raise the water main valve stem 14 and close the water main valve thereby shutting off the fire hydrant operation.

Figure 5:
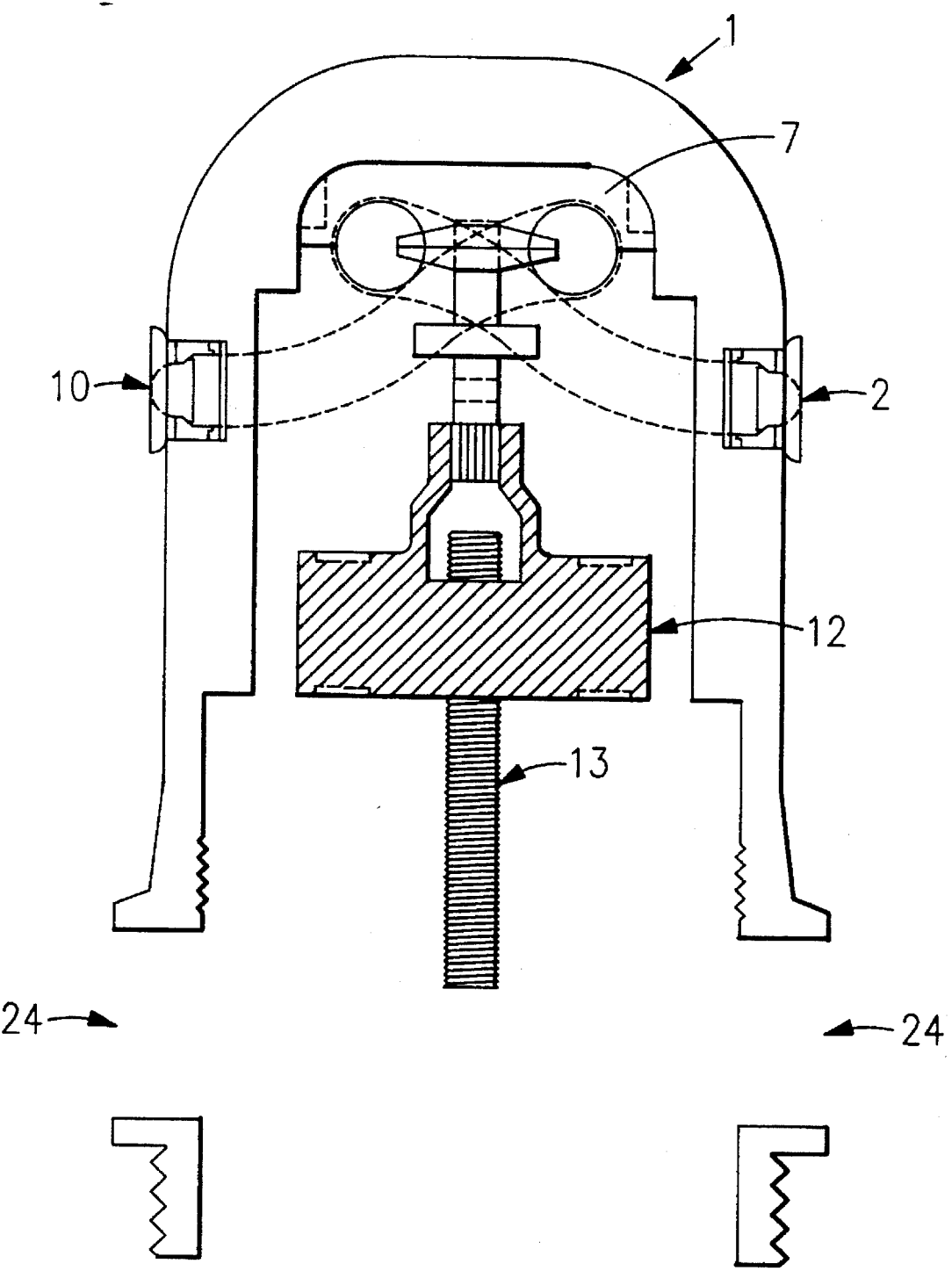
FIG. 5 is a cross-sectional view of another embodiment of the present invention.

Another embodiment of the present invention is as shown in FIG. 5. In FIG. 5 there is shown an outer fire hydrant body 1 which has a first opening 2 and a second opening 10 formed in its outer surface for communication between the interior of the outer fire hydrant body 1 and the outside atmosphere. The first opening 2 and the second opening 10 are capable of receiving nozzles from an external pressurized fluid source, such as the nozzle of a fire truck water hose, the nozzle of a portable fire extinguisher, or other such external pressurized fluid source as is commonly known in the field. An impeller 7 is rotatably mounted within the interior of the fire hydrant body 1 and is operatively engaged with a worm gear 12 so that rotation of the impeller 7 will cause the worm gear 12 to rotate. The worm gear 12 is connected to a drive shaft 13 in such a manner as to cause the drive shaft 13 to be raised or lowered depending on the direction of rotation of the worm gear 12. The drive shaft 13 is connected to a water main valve in such a manner so that the position of the drive shaft 13 will determine whether the water main valve is open or closed.

The first opening 2 is so positioned so that when pressurized fluid is applied to the first opening 2 from an external pressurized fluid source, the pressurized fluid will flow in through the first opening 2 and cause the impeller 7 to rotate in a first direction, thereby rotating the worm gear 12 so as to lower the drive shaft 13. The pressurized fluid after impacting on the impeller 7, so as to cause the impeller 7 to rotate, will then exit the fire hydrant body 1 by means of the second opening 10. The lowering of the drive shaft 13 will cause the water main valve to be opened. When the water main valve is open, water from the water main will fill the interior of the fire hydrant body 1 and exit the fire hydrant body 1 by means of the water discharge ports 24.

The second opening 10 is so positioned so that when pressurized fluid from an external pressurized fluid source is applied to the second opening 10, the pressurized fluid will flow in through the second opening 10 and cause the impeller 7 to rotate in a second direction, thereby causing the worm gear 12 to rotate in a second direction. The rotation of the worm gear 12 in a second direction will cause the drive shaft 13 to be raised, thereby closing the water main valve and shutting off the flow of water from the water main. In this manner the direction of rotation of the impeller 7 is controlled without the need for a directional valve as provided for in the previous embodiment, by controlling whether pressurized fluid is applied from a external pressurized fluid source to the first opening 2 or the second opening 10. When pressurized fluid is applied to the first opening 2, then the pressurized fluid will exit the tire hydrant body 1 by means of the second opening 10 and the water main valve will be opened. When pressurized Fluid is applied to the second opening 10, the pressurized fluid will exit the tire hydrant body 1 by means of the first opening 2 and the water main valve will be closed.

It should also be recognized that the device of the present invention may also be operated by the application of pressurized gas applied from an external pressurized gas source in the same manner as the application of pressurized fluid in the embodiments discussed herein.

In another embodiment of the present invention there is also provided locking means for preventing the removal of the external pressurized fluid source from either the first opening 2 and/or the second opening 10 when the water main valve is open. This is accomplished by providing a nozzle which is attached to the first opening 2 and/or the second opening 10. A pin and a spring are located within the nozzle in such a manner so that the spring will cause the pin to be in a recessed position when the water main valve is closed. When the water main valve is open then water from the water main valve will flow through a channel formed in the fire hydrant body 1. The channel is connected between the lower chamber 27 and the nozzle in such a manner so as to allow water from the water main to flow from the lower chamber 27 through the channel to the pin, and thereby force the pin from its at rest (recessed) position so that the pin will engage the external fluid pressure source and prevent it from being removed until such time as water pressure is no longer being applied against the pin via the channel from the water main, so that the spring will cause the pin to return to its at rest (recessed) position. The pin will therefore engage the external pressurized fluid source when the water main valve is opened and will not release the external pressurized fluid source until the water main is closed. The nozzle is designed to receive nozzles from an external pressurized fluid source, such as a standard fire hose nozzle, fire extinguisher nozzle, or other known device.

What is claimed is:

1. A fire hydrant comprising a fire hydrant body and a drive means for operating a water main valve in response to fluid pressure applied from an external detachable portable pressurized fluid source wherein:

said drive means includes an impeller and a worm gear;

said fire hydrant body has a first opening and a second opening defined therein;

said impeller is rotatably mounted within the fire hydrant body and is operatively engaged with the worm gear so that rotation of the impeller will cause the worm gear to raise and lower a drive shaft located within the fire hydrant body;

said drive shaft is connected to a water main valve in such a manner so that the position of the drive shaft will determine whether the drive shaft is opened and closed;

said first opening is so positioned so that when pressurized fluid is applied to said first opening from an external source, the pressurized fluid will flow in through the first opening and cause the impeller to rotate in a first direction, thereby operating the worm gear so as to lower the drive shaft, the pressurized fluid will then exit said fire hydrant thru the second opening; and said second opening is so positioned so that when pressurized fluid is applied to said second opening from an external source, the pressurized fluid will flow in through the second opening and cause the impeller to rotate in a second direction, thereby operating the worm gear so as to raise the drive shaft, the pressurized fluid will then exit said fire hydrant through the first opening.

2. A fire hydrant comprising a fire hydrant body and a drive means for operating a water main valve in response to fluid pressure applied from an external detachable portable pressurized fluid source wherein:

said fire hydrant body is comprised of an upper chamber and a lower chamber;

said upper chamber has an impeller housing, a fluid inlet port, and a fluid outlet port formed therein;

said drive means is comprised of an impeller, a threaded axle, a worm gear, a drive shaft, and a directional valve;

said impeller is rotatably mounted within the impeller housing;

said threaded axle is operatively engaged with the worm gear and fixedly connected to the center of the impeller so that rotation of the impeller will cause the axle to rotate and thereby operate the worm gear;

the upper end of said drive shaft is operatively engaged with the worm gear so that the worm gear is capable of raising and lowering said drive shaft;

the lower end of said drive shaft is connected to a water main valve in such a manner so that the position of the drive shaft will determine whether the water main valve is opened and closed;

a first conduit is connected from the fluid inlet port to the directional valve;

a second conduit is connected from the directional valve to the impeller housing;

a third conduit is connected from the impeller housing to the directional valve;

a fourth conduit is connected from the directional valve to the water outlet port;

said directional valve has a first setting wherein fluid entering the directional valve from the first conduit will leave the directional valve via the second conduit, enter the impeller housing causing the impeller to rotate in a first direction in such a manner as to lower the drive shaft and thereby open the water main valve, exit the impeller housing via the third conduit, re-enter the directional valve from the third conduit and exit the directional valve via the fourth conduit to the fluid outlet port;

said directional valve has a second setting wherein fluid entering the directional valve from the first conduit will leave the directional valve via the third conduit, enter the impeller housing causing the impeller to rotate in a second direction in such a manner as to raise the drive shaft and thereby close the water main valve, exit the impeller housing via the second conduit, re-enter the directional valve from the second conduit and exit the directional valve via the fourth conduit to the fluid outlet port;

a wall separates the upper chamber from the lower chamber in such a manner as to prevent the flow of fluid between the upper chamber and the lower chamber but to still allow the drive shaft to pass therethrough; and said lower chamber is connected between the upper chamber and a water main and has a plurality of discharge ports formed therein to allow water from the water main to exit through said discharge ports when the water main valve is open.

* * * * *